March 23, 1926. 1,578,068

C. M. BRANDT

ANTISKID DEVICE

Filed April 17, 1925    2 Sheets-Sheet 1

Charles M. Brandt
INVENTOR

BY *Victor J. Evans*
ATTORNEY

WITNESS:

March 23, 1926.

C. M. BRANDT

ANTISKID DEVICE

Filed April 17, 1925  2 Sheets-Sheet 2

1,578,068

Charles M. Brandt
INVENTOR

BY Victor J. Evans
ATTORNEY

WITNESS:

Patented Mar. 23, 1926.

1,578,068

UNITED STATES PATENT OFFICE.

CHARLES M. BRANDT, OF LLANERCH, PENNSYLVANIA.

ANTISKID DEVICE.

Application filed April 17, 1925. Serial No. 23,954.

*To all whom it may concern:*

Be it known that I, CHARLES M. BRANDT, a citizen of the United States, residing at Llanerch, in the county of Delaware and State of Pennsylvania, have invented new and useful Improvements in Antiskid Devices, of which the following is a specification.

This invention relates to anti-skid chains or devices particularly designed for use in connection with automobiles and an object of the invention is to provide a device which may be attached to the wheels of a motor vehicle, to prevent skidding or slipping of the wheels over a smooth or slick surface.

Another object of the invention is to provide an anti-skid device which may be quickly and easily attached to a vehicle wheel with a plurality of anti-skid chains extending transversely of the circumference of the tire of the vehicle wheel, one of said chains being shorter than the chains next thereto on each side of it so as to provide a tight chain for pulling purposes in mud, or the like, while the relatively loose chains may serve to pile up or engage against the taut chain to prevent skidding or slipping, and also to prevent unnecessary mutilation or wear upon the tire structure.

In the present approved types of chains, which go completely about the tire, and also in anti-skid devices, the nature similar to that embodied in the invention when one of the links break, a corresponding portion of the chain is loose and makes an undesirable noise by striking against the fender of the vehicle, and an object of the present invention is to provide a novel form of corresponding links whereby the broken sections of the chain will become disengaged or disconnected and permit it to fall by the roadway when one of the links is broken thereby eliminating the undesirable noise, and also eliminating any liability of injury to the companion or adjacent parts of the vehicle.

A still further object of the invention is to provide a device of this character which may be quickly and easily applied by an unskilled person, and without the use of tools.

Other objects of the invention will appear in the following detail description, and in the accompanying drawings wherein.

Figure 1:
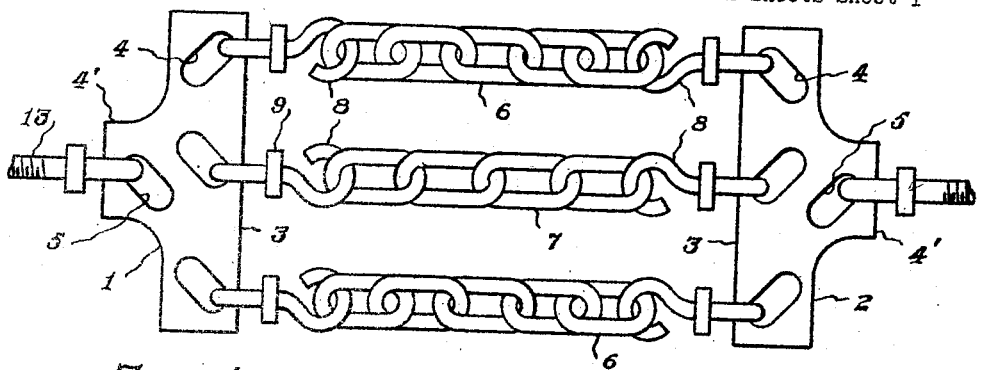
Figure 1 is a plan view of the improved anti-skid device.

Referring more particularly to the drawings, the improved anti-skid device comprises a pair of attaching plates 1 and 2, each of which include the body 3 having the laterally projected extension 4' formed thereon. The bodies 3 are provided with a plurality of substantially oval-shaped openings 4, three of which are provided in each body. The outermost openings 4 are positioned at acute angles to the longitudinal edges of the bodies and lines struck through their longitudinal centers converge at the outer edge of the extension 4'. Each of the extensions 4' is provided with an oval opening 5 which is disposed slightly off parallelism with one of the end openings 4 and in parallelism with the central or intermediate opening 4 in the body 1.

Outer chains 6 and an inner or intermediate chain 7 are provided which are connected by means of links 8 and the respective openings 4 to the attaching plates 1. The links 8 are substantially S-shaped links with the end curves positioned at right angles to each other. The links 8 have laterally extended heads 9 on the ends of the end curves, which heads are of greater length than the width of the openings 4 which openings are, however, longer than the heads 9 so that in case one of the chains 6 or 7 breaks during use, the loose ends of the chain will not flap and strike against the mud guard, fender or the like, and cause undesirable noise by the loosening of the tension on the links 8 but the breaking of the chain will permit the links 8 to move and turn laterally which will eventually bring the heads 9 in registration with the openings 4 and permit disconnection of the broken chain sections and the attaching plates, thereby permitting the broken chain to be lost without doing damage to the vehicle equipped with the device. The respective chains are comparatively inexpensive and may be replaced at a nominal cost.

Figure 2:
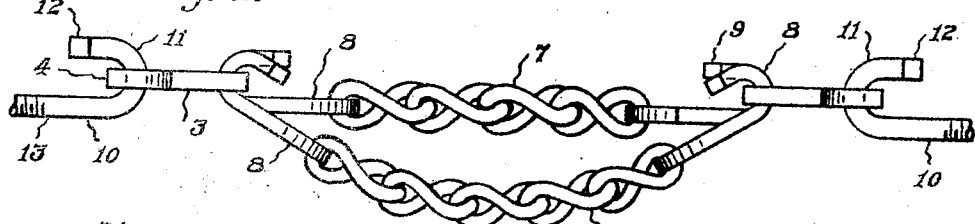
Figure 2 is a side elevation showing it detached from a tire.
Figure 3:
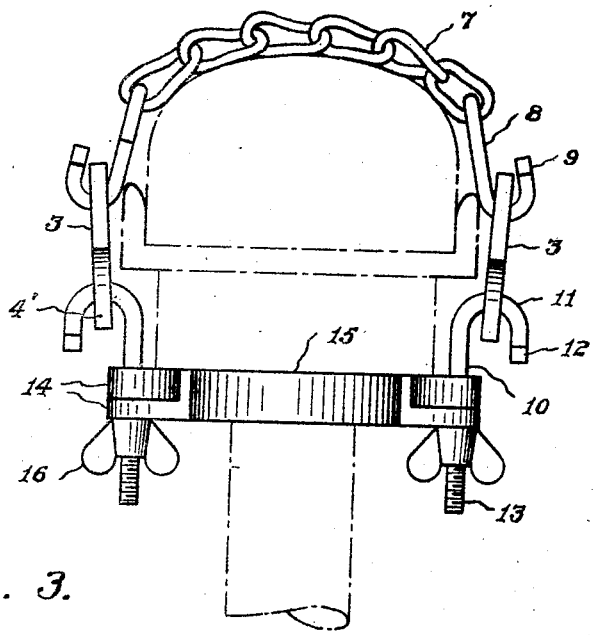
Figure 3 is a side elevation showing it attached to a tire.

The chains 6 are longer than the chain 7, as clearly shown in Figure 2 of the drawings, so that when the device is applied to a wheel, the chain 7 will be held taut across the tread of the tire while the chains 6 are slack, thereby permitting the chain 6 to "pile up" on the chain 7 to provide increased grouting action, and consequently increase the traction of the wheel, as well as eliminating wear on the tire itself.

The attaching plates 1 have bolts 10 associated therewith which bolts have U-shaped ends 11 upon the terminals of which are formed transverse heads 12 similar to the heads 9 formed on the links 8. The heads 12 are longer than the width of the openings 5 and shorter than the length of the openings so as to permit disconnection of the attaching plates by bringing the heads 12 into longitudinal registration with the openings 5. The threaded ends 13 of the bolts 10 extend through the ears 14 on spoke clamping sections 15. The spoke clamping sections 15 are substantially semi-circular in shape and the bolts 10 serve the dual function of connecting the sections 15 about the spoke of a vehicle wheel, as indicated at "A" and of connecting the attaching plates 1 to the spoke clamping structure. Wing nuts 16 of any approved construction may be threaded on the bolts 10 for clamping the anti-skid device properly upon a wheel.

Figure 6:
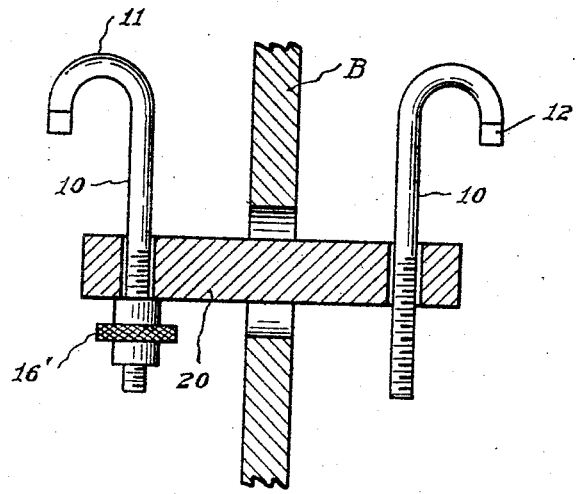
Figure 6 is a detail view illustrating the modified form of the invention.
Figure 4:
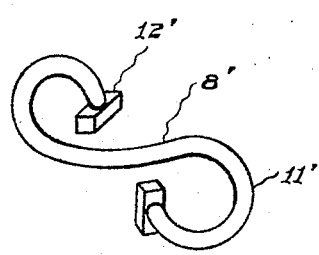
Figure 4 is a detail view of a corresponding link used in the anti-skid device.
Figure 5:
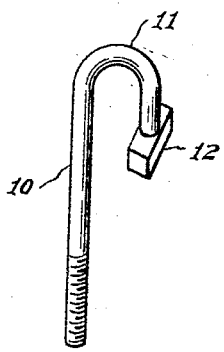
Figure 5 is a detail view of a clamping and coupling bolt used in the anti-skid device structure.
Figure 7:
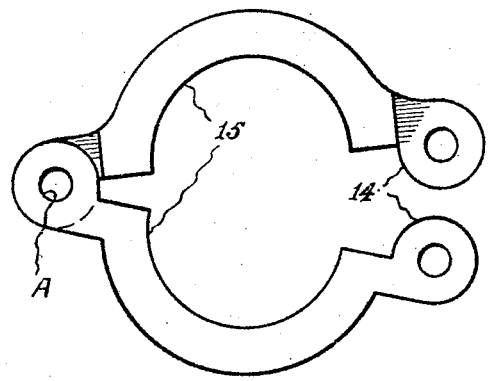
Figure 7 is a detail plan of a clamping collar used in connection with the device.

In Figure 6 of the drawings, a clamp structure 20 is shown which is provided to permit attachment of the anti-skid device to a disc wheel in lieu of a spoke wheel.

It is, of course, to be understood, that the invention may be constructed in various other manners and the parts associated in different relations, and therefore, I do not desire to be limited in any manner, except as set forth, in the claim hereunto appended.

What I claim is:

In an anti-skid device for motor vehicle wheels, attaching plates, a plurality of chains connected to said attaching plates, the outer of said chains being longer than the intermediate chain whereby the intermediate chain will be held taut across the tread of a vehicle tire while the outer chains will be slack, said attaching plates provided with slots, substantially S-shaped connecting links having their end curved portions disposed at right angles to each other, and having heads on their ends for insertion through said slots to detachably connect the chains to the attaching plates.

In testimony whereof I affix my signature.

CHARLES M. BRANDT.